United States Patent
Still

[19]

[11] Patent Number: 6,059,084
[45] Date of Patent: May 9, 2000

[54] SPRAG CLUTCH ASSEMBLY

[75] Inventor: Gerhard Still, Schoenbrunn, Germany

[73] Assignee: Dana Corporation, Toledo, Ohio

[21] Appl. No.: 09/296,710

[22] Filed: Apr. 21, 1999

[51] Int. Cl.$^7$ .................................................. F16D 41/07
[52] U.S. Cl. .................... 192/45.1; 192/45.1; 192/41 A; 188/82.7; 188/82.8
[58] Field of Search ........................................... 192/41 A

[56] References Cited

U.S. PATENT DOCUMENTS

| | | | |
|---|---|---|---|
| 2,599,793 | 6/1952 | Warner | 192/45.1 |
| 2,954,855 | 10/1960 | Lund | 192/45.1 |
| 3,066,779 | 12/1962 | Maurer et al. | 192/45.1 |
| 4,291,795 | 9/1981 | Charchian et al. | 192/45.1 X |
| 4,546,864 | 10/1985 | Hagen et al. | 192/41 A |
| 5,645,149 | 7/1997 | Maurer et al. | 192/45.1 |
| 5,960,917 | 10/1999 | Still | 192/45.1 |

*Primary Examiner*—Rodney H. Bonck
*Attorney, Agent, or Firm*—Rader, Fishman & Grauer PLLC

[57] ABSTRACT

A spray clutch assembly has a first disc having an exterior surface and a second disc spaced apart from the first disc in a generally parallel relationship. A plurality of sprags are circumferentially spaced apart and pivotally mounted between the inner surfaces of the first and second discs. In addition, a plurality of spacer elements are mounted between the first and second discs to hold them at a predetermined distance. At least one spring is provided on an exterior surface of the first annular disc for biasing at least one sprag toward a predetermined position. The present invention preferably has a plurality of springs with each spring corresponding to an individual sprag such that the sprags are individually biased without influence from an adjacent sprag.

21 Claims, 2 Drawing Sheets

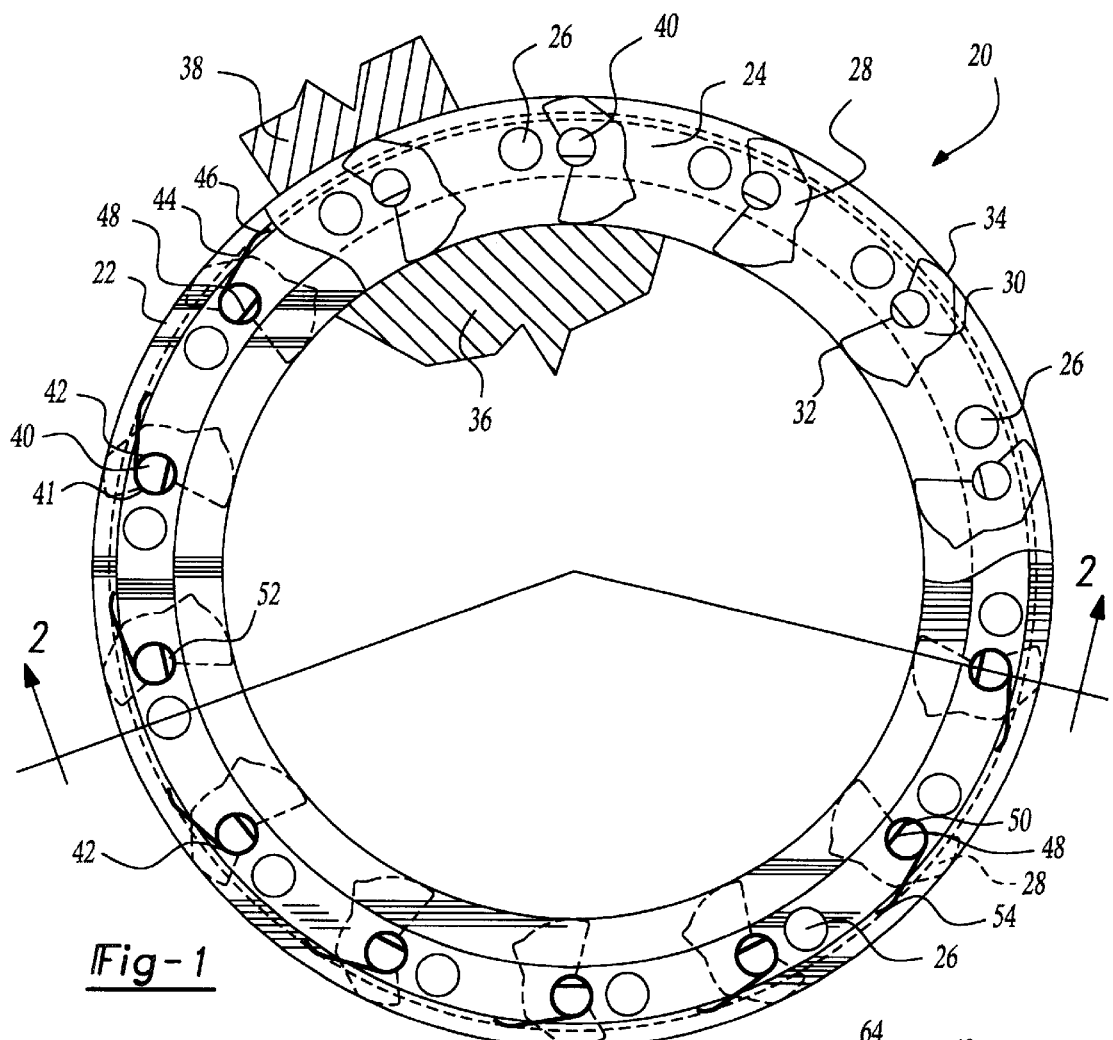
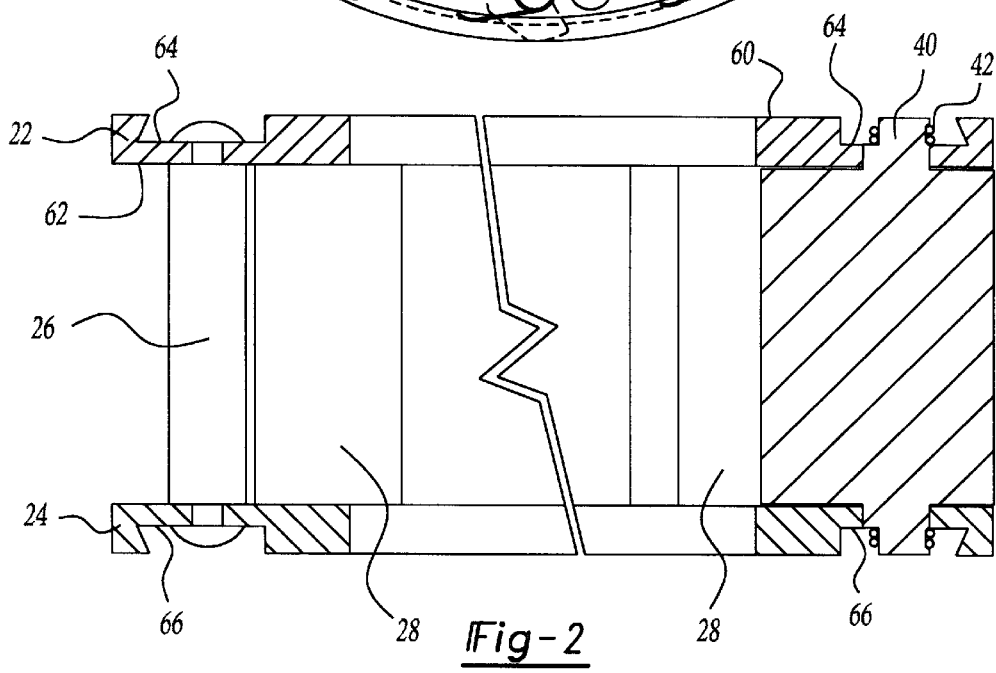

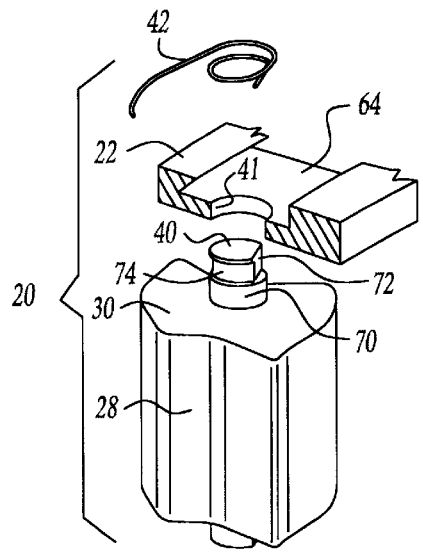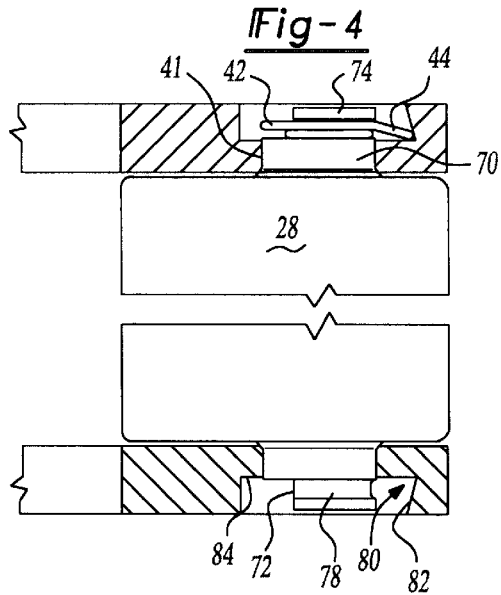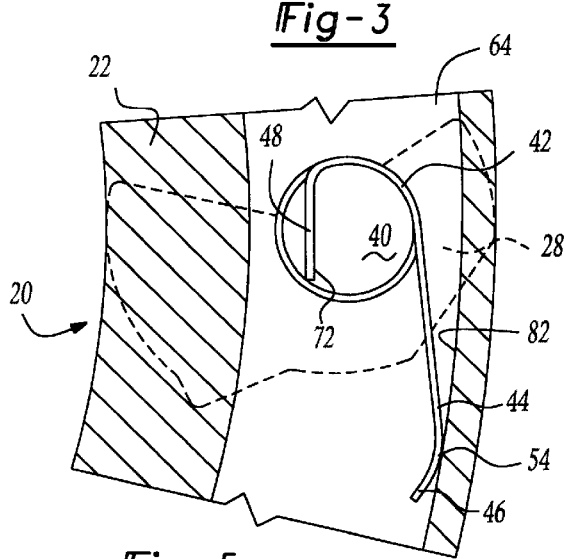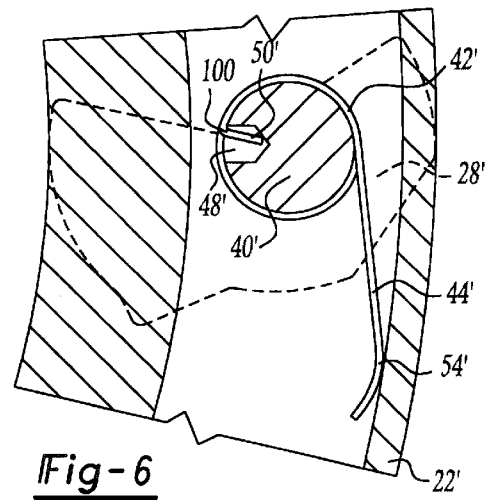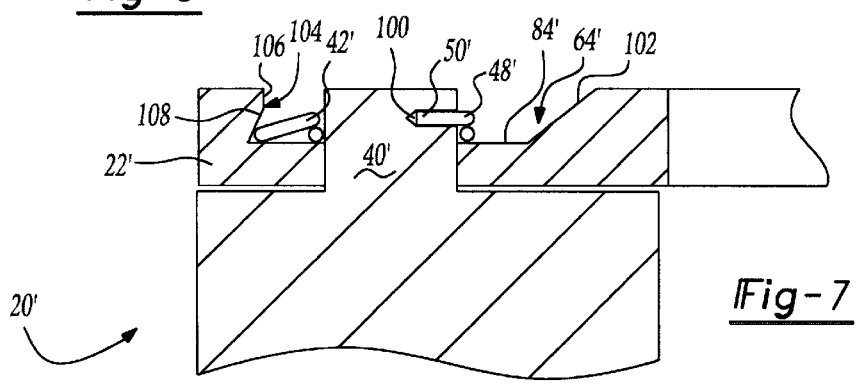

6,059,084

SPRAG CLUTCH ASSEMBLY

FIELD OF THE INVENTION

The present invention relates to a sprag clutch for providing one-way torque transmission. A sprag clutch assembly according to the present invention includes at least one individually mounted spring located on an exterior side of an annular disc for independently biasing a sprag to a desired position.

BACKGROUND OF THE INVENTION

Sprag type clutches are known in the prior art for transmitting torque from an inner raceway to an outer raceway. The clutches have precision components known as sprags, which are rotatably mounted between annular rings that form a cage to hold the sprags in position. In addition, a majority of sprag clutches include spring biasing elements to align the sprags in a desired position when torque is not being transferred by the clutch. Typically, the spring biasing elements are mounted inside the cage, between the annular plates.

However, such a design configuration is not easy to assemble because the springs have to be inserted on the sprags before the annular plates can be connected together. Moreover, the cage is usually riveted together and not susceptible to being opened for repair or servicing if a spring should malfunction. In addition, a sprag clutch assembly can have different actuating or lift off speeds depending on the strength of the spring biasing elements being used. In general, the prior art clutches do not provide a suitable way to easily exchange different strength springs to allow different lift off speeds for the same clutch. In addition, prior sprag clutch designs utilize one spring element to resiliently bias a number of adjacent sprags. Thus, failure of one spring element can impact multiple different sprags.

One proposed sprag clutch design has spring elements located on an exterior of the sprag Clutch cage, however, each sprag is connected to its neighboring sprags by a common spring element.

SUMMARY OF THE INVENTION

The present invention is directed to a sprag clutch assembly having a first annular disc with an inner surface and an outer surface and a second annular disc having an inner surface and an outer surface. The first and second discs are spaced apart a predetermined distance in a generally parallel relationship. A plurality of sprags are circumferenitially spaced apart and pivotally mounted between the inner surfaces of the first and second discs. In addition, a plurality of spacer elements are mounted between the first and second discs for supporting the first and second discs at the predetermined distance. At least one spring is provided having a first end portion contacting the outer surface of the first disc and a second end portion contacting one of the sprags.

More specifically, the present invention includes a plurality of sprags circumferentially spaced apart and pivotally mounted between the inner surfaces of the first and second discs and a plurality of spacer elements mounted between the first and second discs. Preferably, each spring has a first end portion contacting the outer surface of the first disc and a second end portion contacting a sprag to individually bias the sprag without influence from an adjacent sprag.

The sprag clutch assembly of the present invention further includes a recess in the outer disc surface that is continuous and has an undercut for receiving the first end portion of the spring. Additionally, the first end portion of the spring has a generally arcuate shape for improving spring actuation and eliminating binding or unwanted catching. Next, a trunnion is located on each of the first and second sprag ends, the trunnions receiving a respective one of the second end portions of the springs and securing the spring in the both axial and circumferential directions. In one embodiment of the present invention, the trunnion has a generally D-shaped configuration for effectively transferring a biasing force from the spring to the sprag. Preferably, the trunnion further includes a circumferentially extending groove aligned with the D-shaped configuration for axially securing the spring to the trunnion. More specifically, the trunnion includes a generally cylindrical base portion for being received in the first disc and the D-shaped configuration extends downwardly toward the base portion and terminates at approximately the bottom of the groove.

According to a second embodiment of the present invention, the trunnion includes an aperture for receiving the second end portion of the spring for effectively transferring a biasing force from the spring to the sprag. Also, the aperture in the trunnion securely retains the spring both axially and circumferentially.

Thus, the present invention provides a more secure attachment for a spring to a trunnion of a sprag thereby providing more efficient sprag biasing and less likelihood of the spring sliding off of the sprag.

The present invention further provides an easier method to assemble a sprag clutch by providing a readily accessible recess on an exterior surface of the annular discs to receive the springs of the clutch assembly. Also, the sprag clutch assembly insures a relatively easy modification of spring force by permitting quick access for replacing a first spring with a second spring of different strength. Still further, the present invention provides easier repair of a sprag clutch by permitting ready access to a broken spring, without requiring disassembly of the complete sprag clutch. Moreover, the present invention permits relatively less complex spring designs to be used that are relatively inexpensive to manufacture.

BRIEF DESCRIPTION OF THE DRAWINGS

The features and inventive aspects of the present invention will become more apparent upon reading the following detailed description, claims, and drawings, of which the following is a brief description:

FIG. 1 is a top view of a sprag clutch assembly according to the present invention.

FIG. 2 is a cross-sectional view of the sprag clutch assembly taken along line 2—2 of FIG. 1.

FIG. 3 is a partial exploded perspective view of a sprag assembly according to the present invention.

FIG. 4 is a cross-sectional side view of an assembled sprag clutch according to the present invention.

FIG. 5 is a cross-sectional top view showing attachment of a spring according to one embodiment of the present invention.

FIG. 6 is a cross-sectional top view showing spring attachment according to a second embodiment of the present invention.

FIG. 7 is a cross-sectional side view of a sprag clutch according to the present invention.

DETAILED DESCRIPTION OF PREFERRED EMBODIMENTS

FIG. 1 shows a cut away top view of a sprag clutch assembly 20 according to the present invention. Sprag clutch assembly 20 includes a top annular disc 22 spaced apart from a bottom annular disc 24. A plurality of spacer elements 26 are circumferentially spaced apart and mounted between the top and bottom discs 22, 24 to form a cage. Spacer elements 26 maintain top and bottom discs 22,24 at a predetermined distance.

In addition, sprag clutch assembly 20 includes a plurality of sprags 28 that are circumferentially spaced apart and pivotally mounted between top and bottom discs 22, 24. Sprag 28 has a main body 30 with arcuate side walls 32, 34 that respectively engage an outside diameter of a first shaft 36 and an inside diameter of a second shaft 38 to selectively transmit torque in only one direction from first shaft 36 to second shaft 38. Sprag 28 has a trunnion 40 on either end for mounting in corresponding bores 41 in top and bottom discs 22, 24. Next, a spring 42 is provided on each of sprag trunnions 40 for resiliently biasing sprag 28 into contact with the outside diameter of shaft 36 and inside diameter of shaft 38 to insure effective torque transmission in one direction with a minimum of lost motion. Although it is preferred to have one spring 42 on each end of sprag 28, it is also contemplated that springs 42 are only mounted on one end of each sprag 28.

Spring, 42 is illustrated in FIG. 1 as a coil spring having a first leg 44 terminating in a first end 46, which contacts an exterior surface of top disc 22. A second leg, 48 of spring 42 terminates at a second end 50. Second leg 48 is shorter than first leg 44 and engages trunnion 40 along a D-shaped flat area 52. First end 46 optionally, but preferably, has an arcuate foot portion 54 to promote sliding actuation and to prevent first end 46 from digging into or catching on top disc 22. Thus, spring 42 biases sprag 28 in a generally clockwise direction for providing efficient torque transfer between shafts 36, 38.

FIG. 2 shows a top cross-sectional side view of sprag clutch assembly 20 taken along lines 2—2 of FIG. 1. Top disc 22 has an exterior surface 60 and an interior surface 62. Exterior surface 60 further includes a generally annular recess 64 for receiving spring 42 and a portion of trunnion 40. Bottom disc 24 is similar to top disc 22 and includes an annular recess 66 for optionally receiving spring 42. In addition, spacer element 26 has a generally cylindrical shape, however any suitable spacer element shape can be used. FIG. 2 also shows a number of spaced apart sprags 28 mounted between top and bottom discs 22, 24.

FIG. 3 shows a partial exploded perspective view of sprag clutch assembly 20 including sprag 28, top disc 22 and spring 42. Trunnions 40 project outwardly from main body 30 of sprag 28 and have a generally cylindrical base portion 70 and a D-shaped upper portion 72. Optionally, but preferably, a groove 74 is formed in D-shaped upper portion 72 of trunnion 40 to further retain spring 42 against axial movement. D-shaped flat 72 extends downwardly toward cylindrical base portion 70 terminating near the bottom of groove 74. Accordingly, when fully assembled, cylindrical base portion 70 is slidably received in an aperture 78 in top disc 22, as shown in FIG. 4. Next, upper portion 74 of trunnion 40 extends into recess 64 and spring 42 is installed on trunnion 40 by being located in groove 41 and contacting D-shaped flat 72. First leg 44 is also shown in FIG. 4 extending into an undercut 80 provided in recess 64. In the illustrated embodiment, undercut 80 is defined by a tapered side wall 82 and a bottom surface 84 of recess 64.

FIG. 5 shows a partial sectional view of sprag clutch assembly 20 showing spring 42 having first end 46 and more particularly, arcuate foot portion 54 contacting a side wall 82 of recess 64 of top disc 22. Spring 42 is further coiled around trunnion 40 in groove 78 and second leg 48 of spring 42 is bent at an angle to tightly engage the D-shaped flat 72 to efficiently transfer a biasing torque from spring 42 to spring 28.

FIG. 6 shows an alternate attachment method for connecting a spring 42' to a trunnion 40' of a sprag 28'. As illustrated, spring 42' has a foot portion 54' on its first leg 44' and a generally cylindrical trunnion 40' that has a radial blind cross-bore 100 for receiving a second end portion 50' of a second leg 48'. In the embodiment of FIG. 6, spring 42' is securely restrained against axial movement by second leg 48' in bore 100. In addition, bore 100 cooperates with second leg 48' to efficiently transmit biasing torque to sprag 28'. Thus, bore 100 serves the combined functions of groove 78 and D-shaped flat 72 provided in the first embodiment of the present invention.

FIG. 7 shows a cross-sectional side view of a sprag clutch assembly 20' having second end 50' of spring 42' retained in blind bore 100. Side wall 102 of recess 64' forms an obtuse angle with bottom wall 84' to provide sufficient clearance to assemble spring 42', and more particularly leg 48', onto trunnion 40'. Opposing side wall 104 includes a generally vertical first portion 106 and an undercut portion 108 for retaining first leg 44' of spring 42'.

Although recesses 64, 64' have been shown having specific cross-sectional shapes, the present invention contemplates having recesses with any suitable crosssectional shape. Further, spring 42, 42' has been illustrated as a coil spring, however, any suitable type of spring biasing element can be used, including but not limited to, a leaf spring, torsional spring and elastomeric spring.

Preferred embodiments of the present invention have been disclosed. A person of ordinary skill in the art would realize, however, that certain modifications would come within the teachings of this invention. Therefore, the following claims should be studied to determine the true scope and content of the invention.

What is claimed is:

1. A sprag clutch assembly comprising:
    a first annular disc having an inner surface and an outer surface;
    a second annular disc having an inner surface and an outer surface, said first and second discs being spaced apart a predetermined distance in a generally parallel relationship;
    a plurality of sprags circumferentially spaced apart and pivotally mounted between said inner surfaces of said first and second discs;
    a plurality of spacer elements mounted between said first and second discs for supporting said first and second discs at said predetermined distance; and
    at least one spring having a first end portion contacting said outer surface of said first disc and a second end portion contacting one of said sprags.

2. The sprag clutch assembly of claim 1, wherein said outer surface of said first disc includes a recess and said first end portion of said spring is located in said recess.

3. The sprag clutch assembly of claim 2, wherein said recess is continuous and further includes an undercut for receiving said first end portion of said spring.

4. The sprag clutch assembly of claim 1, wherein said first end portion of said spring has a generally arcuate shape for improving spring actuation.

5. The sprag clutch assembly of claim 1, further comprising a trunnion on one end of said sprag and said trunnion contacting said second end portion of said.

6. The sprag clutch assembly of claim 5, wherein said trunnion includes a generally D-shaped configuration for effectively transferring a biasing force from said spring to said sprag.

7. The sprag clutch assembly of claim 6, wherein said trunnion further includes a circumferentially extending groove aligned with said D-shaped configuration for axially securing said spring to said trunnion.

8. The sprag clutch assembly of claim 7, wherein said trunnion includes a generally cylindrical base portion for being received in said first disc and said D-shaped configuration extends downwardly toward said base portion and terminates at approximately the bottom of said groove.

9. The sprag clutch assembly of claim 5, wherein said trunnion includes an aperture for receiving said second end portion of said spring for effectively transferring a biasing force from said spring to said sprag.

10. The sprag clutch assembly of claim 1, wherein said spring is a coil spring and said first end portion is longer in length than said second end portion to provide increased torque.

11. The sprag clutch assembly of claim 1, wherein said at least one spring is a plurality of springs, each spring being individually attached to a corresponding one of said plurality of sprags such that each of said sprags is individually biased without influence from an adjacent sprag.

12. The sprag clutch assembly of claim 11, wherein said springs are selectively removable without disassembly of said first disc from said second disc.

13. A sprag clutch assembly comprising:
a first annular disc having an inner surface and an outer surface;
a second annular disc having an inner surface and an outer surface, said first and second discs being spaced apart a predetermined distance in a generally parallel relationship;
a plurality of sprags circumferentially spaced apart and pivotally mounted between said inner surfaces of said first and second discs;
a plurality of spacer elements mounted between said first and second discs for supporting said first and second discs at said predetermined distance; and
a plurality of springs, each of said springs having a first end portion contacting said outer surface of said first disc and a second end portion contacting a respective one of said sprags wherein each of said sprags is individually biased without influence from an adjacent sprag.

14. The sprag clutch assembly of claim 13, wherein said outer surface of said first disc includes a recess and said first end portions of said springs are located in said recess.

15. The sprag clutch assembly of claim 14, wherein said recess further includes an undercut for receiving said first end portions of said springs.

16. The sprag clutch assembly of claim 13, wherein said first end portions of said springs have a generally arcuate shape for improving spring actuation.

17. The sprag clutch assembly of claim 13, further comprising a trunnion on one end of each of said sprags and said trunnion contacting a respective one of said second end portions of said springs.

18. The sprag clutch assembly of claim 17, wherein said trunnions include a generally D-shaped configuration for effectively transferring a biasing force from said springs to said sprags.

19. The sprag clutch assembly of claim 18, wherein said trunnions further include a circumferentially extending groove aligned with said D-shaped configuration for axially securing said springs to said trunnions.

20. The sprag clutch assembly of claim 17, wherein said trunnions include an aperture for receiving said second end portion of said spring for effectively transferring a biasing force from said springs to said sprags.

21. A sprag clutch assembly comprising:
a first annular disc having an inner surface and an outer surface, said outer surface including a recess having an undercut;
a second annular disc having an inner surface and an outer surface, said first and second discs being spaced apart a predetermined distance in a generally parallel relationship;
a plurality of sprags circumferentially spaced apart and pivotally mounted between said inner surfaces of said first and second discs, said sprags having first and second ends;
a plurality of spacer elements mounted between said first and second discs for supporting said first and second discs at said predetermined distance; and
a plurality of springs, each of said springs having a first end portion contacting said outer surface of said first disc and a second end portion contacting a respective one of said sprags wherein each of said sprags is individually biased without influence from an adjacent sprag;
said first end portions of said springs having a generally arcuate shape for improved spring actuation and said springs are coil springs with said first end portions being longer in length than said second end portions to provide increased biasing torque; and
a trunnion located on each of said first and second sprag ends, said trunnions receiving a respective one of said second end portions of said springs and securing said spring in both axial and circumferential directions.

\* \* \* \* \*

UNITED STATES PATENT AND TRADEMARK OFFICE
CERTIFICATE OF CORRECTION

PATENT NO : 6,059,084
DATED : May 9, 2000
INVENTOR(S) : Gerhard Still

It is certified that error appears in the above-identified patent and that said Letters Patent are hereby corrected as shown below:

Col. 4, line 67
 replace "end portion of said."
 with --end portion of said spring.--

Signed and Sealed this

Tenth Day of April, 2001

Attest:

NICHOLAS P. GODICI

*Attesting Officer*  *Acting Director of the United States Patent and Trademark Office*